United States Patent
Wright et al.

(10) Patent No.: US 12,530,205 B2
(45) Date of Patent: Jan. 20, 2026

(54) SYSTEMS AND METHODS FOR IMPLEMENTING DETERMINISTIC FINITE AUTOMATA (DFAS) VIA A BLOCKCHAIN

(71) Applicant: nChain Licensing AG, Zug (CH)

(72) Inventors: Craig Steven Wright, London (GB); Pedro Jimenez-Delgado, London (GB)

(73) Assignee: NCHAIN LICENSING AG, Zug (CH)

( * ) Notice: Subject to any disclaimer, the term of this patent is extended or adjusted under 35 U.S.C. 154(b) by 848 days.

(21) Appl. No.: 16/345,517

(22) PCT Filed: Oct. 27, 2017

(86) PCT No.: PCT/IB2017/056696
§ 371 (c)(1),
(2) Date: Apr. 26, 2019

(87) PCT Pub. No.: WO2018/078584
PCT Pub. Date: May 3, 2018

(65) Prior Publication Data
US 2019/0279197 A1  Sep. 12, 2019

(30) Foreign Application Priority Data

Oct. 28, 2016 (GB) ..................... 1618233
Oct. 28, 2016 (GB) ..................... 1618234
Oct. 28, 2016 (GB) ..................... 1618235

(51) Int. Cl.
*G06Q 20/38* (2012.01)
*G06F 9/448* (2018.01)
(Continued)

(52) U.S. Cl.
CPC ......... *G06F 9/4498* (2018.02); *G06Q 20/389* (2013.01); *H04L 9/0637* (2013.01); *H04L 63/1416* (2013.01)

(58) Field of Classification Search
CPC ........ G06Q 20/3672; G06Q 20/00–425; G06F 9/4498; H04L 9/0637; H04L 9/00–50
(Continued)

(56) References Cited

U.S. PATENT DOCUMENTS 8,707,252 B1   4/2014  Alexeev et al.
10,050,779 B2  8/2018  Alness et al.
(Continued)

FOREIGN PATENT DOCUMENTS

CN   105893042 A   8/2016
GB    0621356 A   4/1949
(Continued)

OTHER PUBLICATIONS

"Blockchain and Bitcoin", Liu Qi's Blog, Aug. 1, 2016 (Year: 2016).*
(Continued)

*Primary Examiner* — Ari Shahabi
(74) *Attorney, Agent, or Firm* — Tarolli, Sundheim, Covell & Tummino LLP

(57) ABSTRACT

The invention relates to a technique for implementing, controlling and automating a task or process on a blockchain such as, but not limited to, the Bitcoin blockchain. The invention is particularly suited for, but not limited to, automated execution of contracts such as smart contracts for financial agreements. However, other types of tasks and non-financial contracts can be implemented. The invention can be viewed as the implementation or incarnation of a state machine or DFA on a blockchain by using the unspent outputs of blockchain Transactions to represents the states of the machine, and spending of those outputs as the transition of the machine from one state to another. The invention provides a technical realisation and implementation of a mathematical model of computation conceived as an (Continued)

abstract machine that can be in one of a finite set of states, and can change from one state to another (transition) when a triggering event of a finite set (called input) occurs. The invention comprises compilation and codification techniques for the DFA implementation.

15 Claims, 8 Drawing Sheets

(51) Int. Cl.
    *H04L 9/06*     (2006.01)
    *H04L 9/40*     (2022.01)

(58) Field of Classification Search
    USPC .......................................................... 705/66
    See application file for complete search history.

(56) References Cited

U.S. PATENT DOCUMENTS

| | | | | |
|---|---|---|---|---|
| 11,170,371 | B2* | 11/2021 | Karame | G06Q 20/401 |
| 2003/0046093 | A1 | 3/2003 | Erickson et al. | |
| 2003/0065546 | A1 | 4/2003 | Gorur et al. | |
| 2008/0101371 | A1* | 5/2008 | Law | H04L 69/22 |
| | | | | 370/392 |
| 2015/0379510 | A1 | 12/2015 | Smith | |
| 2016/0109870 | A1* | 4/2016 | Firu | H04L 9/0643 |
| | | | | 326/46 |
| 2016/0283941 | A1 | 9/2016 | Andrade | |
| 2016/0306982 | A1 | 10/2016 | Seger, II et al. | |

FOREIGN PATENT DOCUMENTS

| | | |
|---|---|---|
| GB | 1607477.5 | 4/2016 |
| JP | 6646764 B2 | 2/2020 |
| KR | 102427013 B1 | 7/2022 |

OTHER PUBLICATIONS

A56FG4BJGM345 et al., "Peter Todd: [. . ] This is an Approach to Building Sophisticated Smart Contracts on Top of Bitcoin," Reddit, Jun. 20, 2016, https://www.reddit.com/r/Bitcoin/comments/4oxysu/peter_todd_this_is_an_approach_to_building/, 3 pages.
Andrychowicz et al., "Modeling Bitcoin Contracts by Timed Automata," https://arxiv.org/abs/1405.1861, May 8, 2014, 23 pages.
Antonopoulos, "Mastering Bitcoin—Unlocking Digital Cryptocurrencies," O'Reilly Media, Inc., Dec. 20, 2014, 282 pages.
Flood et al., "Contract as Automaton: The Computational Representation of Financial Agreements," Office of Financial Research Working Paper, Mar. 16, 2015 [Revised Mar. 27, 2017]., 50 pages.
Hill, "Jenny From the Blockchain," Scott Logic Blog, Apr. 4, 2016, blog.scottlogic.com/2016/04/04/jenny-from-the-blockchain.html, 17 pages.
International Search Report and Written Opinion mailed Feb. 6, 2018, Patent Application No. PCT/IB2017/056696, 9 pages.
Kolain et al., "Speed Dating on Smart Contracts," CeDEM 16 Proceedings of the International Conference for E-Democracy and Open Government 2016, May 18-20, 2016, 6 Pages.
Konishi et al., "An Agent Based Transaction Model for Distributed Cooperation Processings," Institute of Electronics, Information and Communication Engineers, Technical Report of the IEICE 98(486):49-56, Dec. 17, 1998.
Nakamoto, "Bitcoin: A Peer-to-Peer Electronic Cash System," Bitcoin, Oct. 31, 2008, https://bitcoin.org/bitcoin.pdf, 9 pages.
Pinna, "A Petri Net-based Model for Investigating Disposable Addresses in Bitcoin System," University of Cagliari, 2016, 4 pages.
Qi, "Blockchain and Bitcoin," Liu Qi's Blog, Aug. 1, 2016, https://leuchine.github.io/2016/08/01/Blockchain-and-Bitcoin-(4).html, 4 pages.
Satoshi et al., "Connection Limits," Bitcoin Forum, Aug. 9, 2010, https://bitcointalk.org/index.php?topic=741.0;prev_next=prev, 2 pages.
Schuh, "[Hyperledger Project TSC] IBM Whitepaper," Feb. 23, 2016, Retrieved from https://lists.hyperledger.org/g/tsc/topics, 3 pages.
Todd et al., "Tweet Oct. 6, 2015," https://twitter.com/peterktodd/status/651383267699093504, Oct. 6, 2015 [retrieved Mar. 10, 2022], 2 pages.
Todd, "Building Blocks of the State Machine Approach to Consensus," petertodd.org, Jun. 20, 2016 [retrieved Feb. 5, 2018], https://petertodd.org/2016/state-machine-consensus-building-blocks, 15 pages.
UK Commercial Search Report mailed Feb. 3, 2017, Patent Application No. GB510347.0, 9 pages.
UK IPO Search Report mailed Mar. 15, 2017, Patent Application No. GB1618233.9, 4 pages.
Wikipedia, "Deterministic finite automaton", published Sep. 30, 2016 (archived version) <URL: https://en.wikipedia.org/w/index.php?title=Deterministic_finite_automaton&oldid=741838082, 6 pages.
Svensson, D. et al., "SecuRES: Secure Resource Sharing System: An investigation into use of public ledger technology to create decentralized digital resource-sharing systems", KTH Royal Institute of Technology, Stockholm, Sweden, published 2015, URL: https://www.diva-portal.org/smash/get/diva2:929889/FULLTEXT01.pdf, 128 pages.
Australian Patent Office, "Examination Report No. 1", Application No. 2017349752, dated Oct. 28, 2021, 9 pages.
European Patent Office, "Search Report" Mailed Sep. 1, 2022, Patent Application No. 21218347.9-1203, 10 pages.
pxjw.home, "PXJW", https://www.cnblogs.co <http://www.cnblogs.co/>m/pengjunwei/p/4445407.html, Apr. 21, 2015, 5 pages.
China National Intellectual Property Administration, "Search Report" in Application No. 2017800664080, Oct. 27, 2017, 4 pages.
China National Intellectual Property Administration, "The First Office Action" in Application No. 2017800664080, Aug. 29, 2022, 8 pages.
Intellectual Property of India, "Examination Report" in Application No. 201947018143, Mar. 12, 2021, 6 pages.
Republic of Korea, "Decision of Patent" in Applicaiton No. 10-2019-7014561, Apr. 28, 2022, 3 pages.
Korean Intellectual Property Office, "Office Action" in Application No. 10-2022-7025856, Jan. 31, 2023, 5 pages.
Japan Patent Office, "Office Action" in applicaiton No. 2022-032373, dated May 30, 2023, 3 pages.
Australian Patent Office, "Examination Report No. 1" Application No. 2022252826, Jul. 11, 2023, 6 pages.
Kushti, et al., "ATs with FSM-based DSL" published 2014, downloaded from the internet Aug. 29, 2022, https://nxforum.org/automated-transactoins/ats-with-fsm-based-dsl/, 15 pages.
Australian Patent Office, "Examination Report No. 2" Application No. 2022252826, Sep. 15, 2023, 3 pages.
The State Intellectual Propetry Office of People's Republic of China, "Third Office Action" in Application No. 201780066408.0, Dec. 12, 2023, 10 pages.
Rauchs, Michel, "Cryptocurrencies Meeting Business Ecosystems: The Case of Bitcoin", Grenoble Ecole de Management Fall 2016, 128 pages.
Australian Patent Office, "Examination Report No. 3", in Application No. 2022252826, May 16, 2024, 8 pages.
Buterin, "Ethereum White Paper", A Next Generation Smart Contract & Decentralized Application Platform, 2014, 36 pages.
JP Office Action for JP Patent Application No. 2023-194043, dated Feb. 12, 2025, 8 pages.
Extended European Search Report (EESR) for corresponding EP Application No. 24170585.4, dated Jul. 14, 2025, 12 pages.
KROA: Office Action issued Oct. 29, 2025 for corresponding Korean application No. 10-2024-7005555.

* cited by examiner

FIGURE 2

Figure 2 provides an illustrative embodiment of the invention wherein a smart contract is executed as a DFA implemented on a blockchain using P2PKH Transactions to represent the states that are triggered and entered.

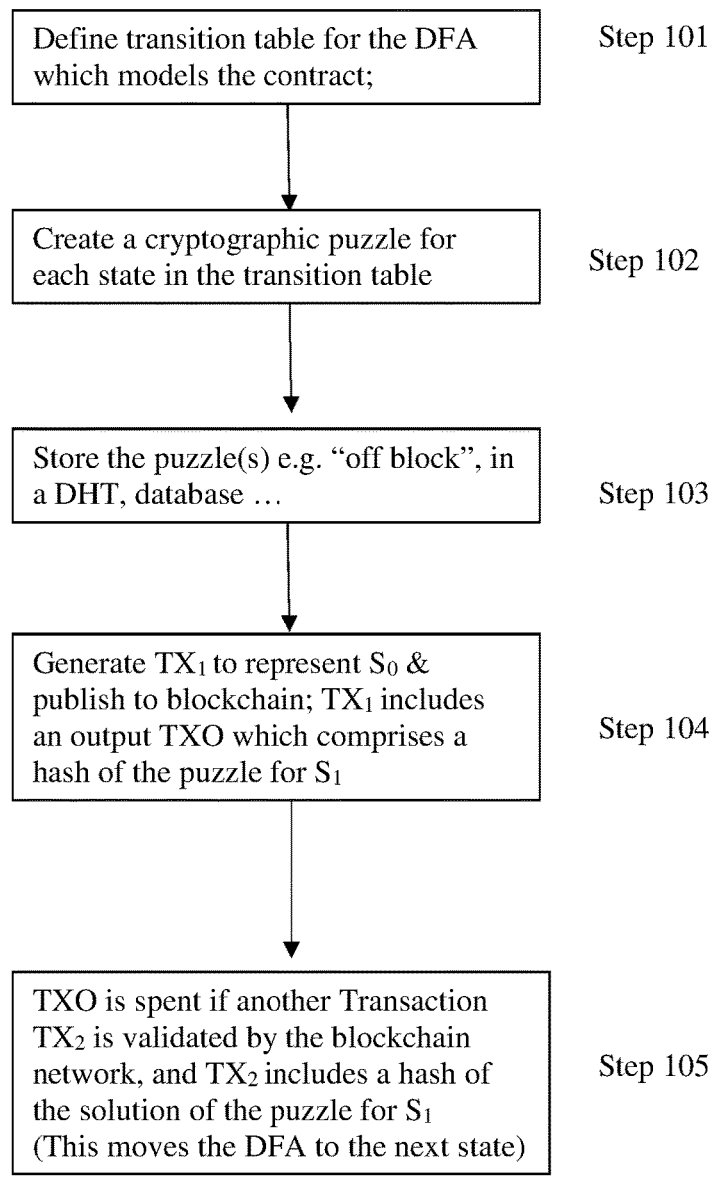

Define transition table for the DFA which models the contract;   Step 101

Create a cryptographic puzzle for each state in the transition table   Step 102

Store the puzzle(s) e.g. "off block", in a DHT, database ...   Step 103

Generate $TX_1$ to represent $S_0$ & publish to blockchain; $TX_1$ includes an output TXO which comprises a hash of the puzzle for $S_1$   Step 104

TXO is spent if another Transaction $TX_2$ is validated by the blockchain network, and $TX_2$ includes a hash of the solution of the puzzle for $S_1$ (This moves the DFA to the next state)   Step 105

FIGURE 3

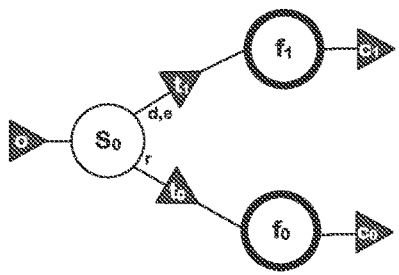

Diagram describing a blockchain-based DFA for a zero-coupon bond contract.

FIGURE 4

| Transaction identifier | | | origination $o$ |
|---|---|---|---|
| Version number | | | <version number> |
| Number of inputs | | | 1 |
| Input | Previous transaction | Hash | <10 mBTC from originator> |
| | | Output index | 00 |
| | Length of signature script | | <unlocking script length> |
| | Signature script | | <originator signature> <originator public key> |
| | Sequence number | | <sequence number> |
| Number of outputs | | | 2 |
| Output 0 | Value | | 600000 |
| | Length of public key script | | <locking script length> |
| | Public key script | | OP_HASH256 <state $s_\theta$ puzzle> OP_EQUAL |
| Output 1 | Value | | 300000 |
| | Length of public key script | | <locking script length> |
| | Public key script | | OP_DUP OP_HASH160 <Botnet agent public key hash> OP_EQUALVERIFY OP_CHECKSIG |
| Locktime | | | 0 |

FIGURE 5

| Transaction identifier | | | transition $t_f$ |
|---|---|---|---|
| Version number | | | <version number> |
| Number of inputs | | | 1 |
| Input | Previous transaction | Hash | <6 mBTC from origination $o$> |
| | | Output index | 00 |
| | Length of signature script | | <unlocking script length> |
| | Signature script | | <state $s_e$ puzzle solution> |
| | Sequence number | | <sequence number> |
| Number of outputs | | | 2 |
| Output 0 | Value | | 400000 |
| | Length of public key script | | <locking script length> |
| | Public key script | | OP_HASH256 <state $f_f$ puzzle> OP_EQUAL |
| Output 1 | Value | | 100000 |
| | Length of public key script | | <locking script length> |
| | Public key script | | OP_DUP OP_HASH160 <Botnet agent public key hash> OP_EQUALVERIFY OP_CHECKSIG |
| Locktime | | | 0 |

FIGURE 6

| Transaction identifier | | | completion $c_f$ |
|---|---|---|---|
| Version number | | | <version number> |
| Number of inputs | | | 1 |
| Input | Previous transaction | Hash | <4 mBTC from transition $t_f$> |
| | | Output index | 00 |
| | Length of signature script | | <unlocking script length> |
| | Signature script | | <state $f_f$ puzzle solution> |
| | Sequence number | | <sequence number> |
| Number of outputs | | | 2 |
| Output 0 | Value | | 100000 |
| | Length of public key script | | <locking script length> |
| | Public key script | | OP_DUP OP_HASH160 <originator public key hash> OP_EQUALVERIFY OP_CHECKSIG |
| Output 1 | Value | | 200000 |
| | Length of public key script | | <locking script length> |
| | Public key script | | OP_DUP OP_HASH160 <Botnet agent public key hash> OP_EQUALVERIFY OP_CHECKSIG |
| Locktime | | | 0 |

FIGURE 7

| Transaction identifier | | origination $o$ |
|---|---|---|
| Version number | | <version number> |
| Number of inputs | | 1 |
| Input | Previous transaction — Hash | <10 mBTC from originator> |
| | Previous transaction — Output index | 00 |
| | Length of signature script | <unlocking script length> |
| | Signature script | <originator signature> <originator public key> |
| | Sequence number | <sequence number> |
| Number of outputs | | 2 |
| Output 0 | Value | 600000 |
| | Length of public key script | <locking script length> |
| | Public key script | OP_HASH160 <state $s_\theta$ redeem script hash> OP_EQUAL |
| Output 1 | Value | 300000 |
| | Length of public key script | <locking script length> |
| | Public key script | OP_DUP OP_HASH160 <Botnet agent public key hash> OP_EQUALVERIFY OP_CHECKSIG |
| Locktime | | 0 |

FIGURE 8

| Transaction identifier | | transition $t_f$ |
|---|---|---|
| Version number | | <version number> |
| Number of inputs | | 1 |
| Input | Previous transaction — Hash | <6 mBTC from origination $o$> |
| | Previous transaction — Output index | 00 |
| | Length of signature script | <unlocking script length> |
| | Signature script | OP_0 <Botnet agent signature> <state $s_\theta$ redeem script> |
| | Sequence number | <sequence number> |
| Number of outputs | | 2 |
| Output 0 | Value | 400000 |
| | Length of public key script | <locking script length> |
| | Public key script | OP_HASH160 <state $f_f$ redeem script hash> OP_EQUAL |
| Output 1 | Value | 100000 |
| | Length of public key script | <locking script length> |
| | Public key script | OP_DUP OP_HASH160 <Botnet agent public key hash> OP_EQUALVERIFY OP_CHECKSIG |
| Locktime | | 0 |

FIGURE 9

| Transaction identifier | | completion $c_f$ |
|---|---|---|
| Version number | | <version number> |
| Number of inputs | | 1 |
| Input | Previous transaction — Hash | <4 mBTC from transition $t_f$> |
| | Previous transaction — Output index | 00 |
| | Length of signature script | <unlocking script length> |
| | Signature script | OP_0 <Botnet agent signature> <state $f_f$ redeem script> |
| | Sequence number | <sequence number> |
| Number of outputs | | 2 |
| Output 0 | Value | 100000 |
| | Length of public key script | <locking script length> |
| | Public key script | OP_DUP OP_HASH160 <originator public key hash> OP_EQUALVERIFY OP_CHECKSIG |
| Output 1 | Value | 200000 |
| | Length of public key script | <locking script length> |
| | Public key script | OP_DUP OP_HASH160 <Botnet agent public key hash> OP_EQUALVERIFY OP_CHECKSIG |
| Locktime | | 0 |

FIGURE 10

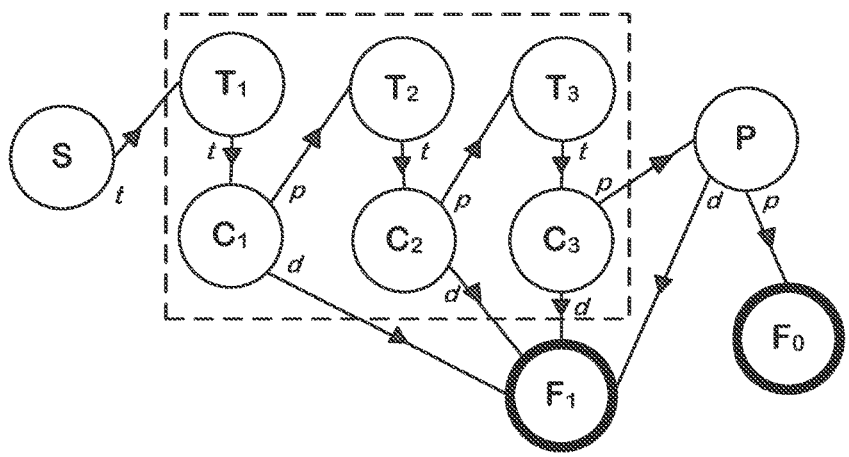

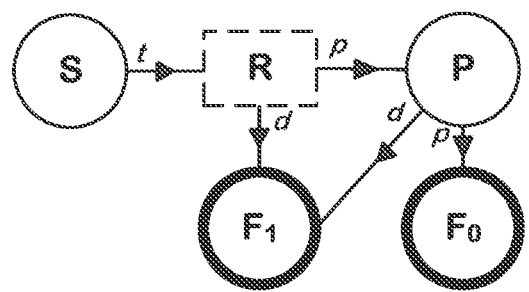
Figure 11: State diagram of the coupon bond with a recurrent state.
FIGURE 12
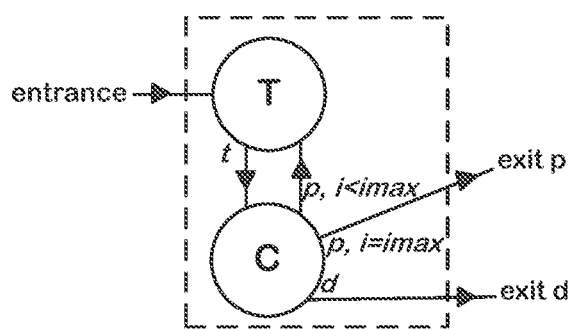

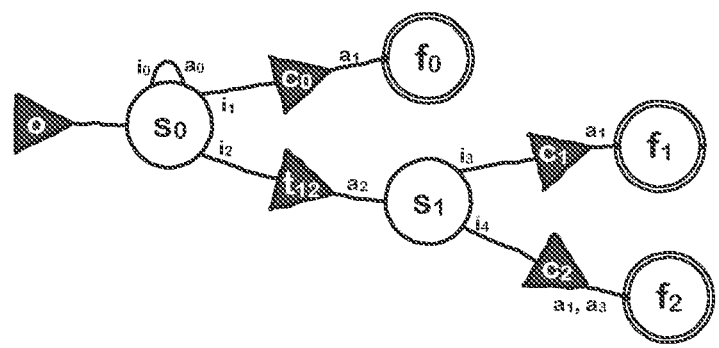
Figure 13: State diagram for a European call option example of the "compilation and execution" section of the application, showing the states (blobs) and the blockchain transactions (triangles) to be submitted: origination (o), transitions (t) and completions (c).

SYSTEMS AND METHODS FOR IMPLEMENTING DETERMINISTIC FINITE AUTOMATA (DFAS) VIA A BLOCKCHAIN

This invention relates generally to systems and protocols for the automated execution of computer-based processes computer protocols and, more particularly, to the verification, enforcement and/or performance of condition controlled processes such as, for example, those relating to contracts. The invention is no, however, limited to use in relation to contracts. The invention also relates to blockchain technology such as, but not limited to, the Bitcoin blockchain, and may be used to advantage with a smart contract.

It has long been desirable to use computers to automate and control the execution of tasks and processes. This is especially true, for example, in relation to the execution of agreements between parties such as those relating to financial agreements. Smart contracts have been a topic of academic research and practical interest since the realisation that an electronic version of the essence of a contract can be better defined and subsequently executed and enforced by computers. One of the key problems with modern contract management is that it tends to be ad-hoc, with local stores and copies of contracts that are manually maintained. This copies can become out of synch with each other, and require their own storage and maintenance. This is inefficient and gives rise to problems relating to security and cost. These problems can be addressed at least in part by automating the performance of a machine-readable and executable documents (sometimes referred to in the art as "smart contracts"). Such automated solutions also help to minimise possible ambiguities and interpretations arising from natural language and legalese. As a consequence, contracts can be performed in a less costly yet more efficient and reliable manner if they are automated.

Among the different approaches which have been proposed in the literature, it has been shown that deterministic finite automata (DFA), also known as deterministic finite state machines, have a rich enough structure to represent a wide range (if not all) of imaginable financial agreements, as well as other kinds of contracts. The concept of Finite State Machines and DFAs are well known within computing sciences. A DFA is a mathematical model of computation conceived as an abstract machine which can be in one of a finite set of states, and can change from one state to another (transition) when a triggering event or condition occurs. Its computational capabilities are more than those of combinational logic but less than those of a stack machine.

The automated execution of contracts has also been investigated recently in relation to blockchain technology. An example of this is CN 105893042 A, which discusses the use of a blockchain as a secure storage facility for data relating to state changes that have occurred during the execution of a smart contract. However, blockchain technology, transaction outputs and their associated scripts can be used in a much more sophisticated and technically complex manner to provide more intelligent behaviour, as discussed herein.

A blockchain is a computer-implemented, decentralised, distributed peer-to-peer computer system made up of unchangeable blocks which in turn are made up of Transactions. It involves a consensus-based protocol. Each block contains a hash of the previous block so that blocks become chained together to create a tamper-proof and permanent record of all Transactions which have been written to the blockchain since its inception. These blocks can be publicly inspected but cannot be altered or removed once they have become part of the blockchain as alterations would cause a change to the hash.

Transactions contain small programs known as scripts embedded into its inputs and outputs, which specify how and by whom the outputs of the transaction can be accessed. Each unspent Transaction (referred to as UTXO) can be spent as an input into a new transaction, and thus the chain grows over time. Each output has an associated amount of currency which can be spent to an address on the network as long as it complies with the requirements specified in the output's locking script. An address is the public key of a cryptographic asymmetric key pair. A P2PKH (pay to public key hash) output is an output which pays its value to an address (public key) directly, while an output in a P2SH (pay to script hash) Transaction is associated with a pubkey script (also known as an unlocking script) containing a hash of a second script, the redeem script which the receiver must provide, along with his signature, in a subsequent Transaction in order to spend the output.

The most widely known application of block chain technology is the Bitcoin distributed ledger, although other blockchain implementations have been proposed and developed. While Bitcoin may be referred to herein for the purpose of convenience and illustration, it should be noted that the invention is not limited to use with the Bitcoin blockchain and alternative blockchain implementations fall within the scope of the invention.

Blockchain technology is known for the use of cryptocurrency implementation. However, in more recent times, digital entrepreneurs have begun exploring both the use of the cryptographic security system Bitcoin is based on, and the data that can be stored on the Blockchain, to implement new systems. As a result, computer protocols known as "smart contracts" have begun to attract attention as they can enable the automated enforcement or performance of a contract, either partially or in its entirety. Blockchain-implemented smart contracts can provide benefits such as enhanced security, a public record of events which is tamper-proof and permanent, and reduced transactions costs.

Thus, it is desirable to provide a solution which provides the benefits arising from the automation of a process such as a contract, and the benefits of using a blockchain for that automation.

Such an improved solution has now been devised. The invention is defined in the appended claims.

In accordance with the invention, there may be provided a blockchain-implemented method/system. This may be described as a method/system for the automated performance and control of a technical process. The present invention may provide a technological innovation which facilitates the automated performance of a process via the implementation or practical incarnation of a Finite State Machine or DFA on the infrastructure of a blockchain. The states of the machine may be defined and determined. The conditions or triggers for each state transition may be stored. Upon execution of the process, the executed states may be recorded on the permanent blockchain ledger. Blockchain Transactions may function as agents or participants who cause the machine to move from one state to another. Each state transition may represent or correspond to a step in the process. When the DFA defines a contract, the invention may provide a mechanism for the automatic execution and enforcement of the commitments of the different contracting parties, as well as other clauses and provisions.

Additionally or alternatively, the invention may be described as a method/solution of using a blockchain to control a computer-implemented process that is being executed off the blockchain. Thus, it may comprise the interaction of computer-based systems which are very different in terms of their architecture and protocols. One or more of the features described above may be used in accordance with this aspect of the invention.

One or more embodiments of the invention may provide a method of implementing (incarnating or realising) a DFA on or in conjunction with a blockchain. The DFA may be a software-based DFA. The blockchain may be implemented in conjunction with a Bitcoin-based protocol, or may use another blockchain protocol. Additionally or alternatively, it may be a method arranged to enable the determination of the state of a blockchain-implemented DFA. This may be the current state. The method may enable the dynamic (at run time) determination of the state of a DFA. Thus, one or more aspects of the invention may provide a mechanism for implementing a DFA on a blockchain in a more accurate, complex and intelligent manner than simply being used as a secure storage facility for recording data about events that have already occurred.

It may comprise the step of associating a portion of a locking script of an unspent output ($UTXO_1$) of a blockchain transaction ($Tx_1$) with a given state of the DFA. The portion of the locking script may be a portion of data within the locking script. It may be a portion of metadata. It may be an identifier, label or tag.

Thus, the invention may use unspent transaction outputs (UTXOs) on the blockchain to record and identify the state that the DFA has been in and/or is currently in at a given point in execution.

The method may comprise the step of:
using a further transaction ($Tx_2$) to make a transition from the state of the DFA to a further state by spending the output ($UTXO_1$) of the transaction ($Tx_1$). The further state may be associated with a portion of data provided within a locking script of an unspent output ($UTXO_2$) of the further transaction. Thus, spending the UTXO may cause a change of DFA state to be recorded or incarnated in the blockchain.

The method may comprise the step of:
using a portion of code to implement or represent at least one state transition trigger which, when executed, causes a further transaction ($Tx_2$) to spend the output ($UTXO_1$) of the transaction ($Tx_1$) and thus move the DFA to another state.

The portion of code may comprise a machine-testable condition which provides a Boolean result based upon an input signal. The input signal may be determined at run time and may be used by the portion of code to determine whether or not the unspent output ($UTXO_1$) should be spent so as to move the DFA to the further state.

The portion of data in the unspent output ($UTXO_1$) may be provided in a locking script. The portion of data may be a tag, label or a portion of metadata.

The DFA may be a model of a machine-executable smart contract.

The unspent output ($UTXO_1$) may comprise a locking script which includes a hash of a puzzle, the solution of which must be provided by an input of a further transaction in order to spend the output ($UTXO_1$) and transition the DFA to another state.

The unspent output ($UTXO_1$) may comprise a locking script which includes a hash of a redeem script which must be provided by an input of a further transaction in order to spend the output ($UTXO_1$) and transition the DFA to another state. The redeem script may comprise a cryptographic key.

The method may comprise the step of using one or more computing agents to perform any feature described above or hereafter.

The invention also provides a system arranged to implement the method of any embodiment mentioned above. The system comprise may comprise:
a blockchain platform; (this may or may not be the Bitcoin blockchain)
at least one computing agent arranged to implement the DFA via the blockchain.

Additionally or alternatively, the method may comprise the step of:
using at least one input signal to execute at least one condition and, based on the outcome of the execution of the condition, perform an action in accordance with a state transition table for the DFA.

Performance of the action may be identifiable or detectable from the state of a blockchain ledger. This may be achieved by looking at/analysing the outputs of one or more blockchain transactions. If a transaction relates to the DFA and/or a contract that the DFA relates to, then the output(s) may be inspected to determine whether the output has been spent or not. The state of the DFA may be discerned from the fact that an output is still unspent. This may be discerned by consulting a state transition table that has been devised for the DFA. It may have been devised prior to execution of the method/system.

The action may be performed using a transaction (Tx) on the blockchain. The action may be identifiable from an output and/or an input of at least one transaction on a blockchain.

The method may comprise the step of analysing the state of the blockchain to determine the current state of the DFA based on whether or not an action has been performed. The DFA may represent or model the execution of a contract. The contract may be a machine-executable smart contract.

The at least one input signal may be a signal or value generated and/or provided by a human or non-human source. For example, it may be generated by the computer on which the method is executing e.g. a time or date derived from a system clock. It may be received from a source external to the computer e.g. from a remote sensor or remote computing resource.

The at least one input signal may provide a trigger for a transition from one state of the DFA to another, or may cause a trigger to "fire" or be activated, causing an ensuing action.

The method may comprise the step of determining the state transition table for the DFA. The state transition table may be codified in software. The software may comprise instructions relating to given input signals and the state transitions and/or machine-executable actions which they trigger.

The method may comprise the step of associating a portion of (data in) the locking script of an unspent output ($UTXO_1$) of a blockchain transaction ($Tx_1$) with a given state of the DFA. The method may comprise the step of using a further transaction ($Tx_2$) to make a transition from the state of the DFA to a further state by spending the output ($UTXO_1$) of the transaction ($Tx_1$). The further state may be associated with a portion of data provided within a locking script of an unspent output ($UTXO_2$) of the further transaction.

The method may comprise the step of using a portion of code comprising the at least one computer-executable condition, to implement or represent at least one state transition trigger which, when executed, causes a further transaction ($Tx_2$) to spend the output ($UTXO_1$) of the transaction ($Tx_1$)

and thus move the DFA to another state. The portion of code may comprise a condition which provides a Boolean result based upon the input signal.

The method may comprise the step of maintaining a record of the number of times a particular state has been occupied by the DFA. The record may be maintained using an index which is incremented within a loop or iterating construct. The loop or iterating construct may terminate when a pre-defined condition is met.

The software-implemented DFA may be implemented and/or executed using a distributed architecture or system. The invention may also provide a system arranged to implement any embodiment of the method described above or hereafter.

The invention may provide a software-implemented DFA comprising software arranged to:
use at least one input signal to execute at least one condition and, based on the outcome of the execution of the condition, perform an action in accordance with a state transition table for the DFA; wherein performance of the action is identifiable from the state of a blockchain ledger.

The invention may provide a method comprising the step of associating a portion of a locking script of an unspent output ($UTXO_1$) of a blockchain transaction ($Tx_1$) with a given state of the DFA. The portion of the locking script may be a portion of data within the locking script. It may be a portion of metadata. It may be an identifier, label or tag. Thus, the invention may use unspent transaction outputs (UTXOs) on the blockchain to record and identify the state that the DFA has been in and/or is currently in at a given point in execution.

The method may comprise the step of using a further transaction ($Tx_2$) to make a transition from the state of the DFA to a further state by spending the output ($UTXO_1$) of the transaction ($Tx_1$). The further state may be associated with a portion of data provided within a locking script of an unspent output ($UTXO_2$) of the further transaction. Thus, spending the UTXO may cause a change of DFA state to be recorded or incarnated in the blockchain.

The invention may be substantially as described below with respect to the "codification Technique" section of the description but may also incorporate features from other sections of the document and incorporate any feature described herein.

Additionally or alternatively, the invention may comprise the step of executing a program which is arranged to monitor for and/or receive an input signal and, responsive to the input signal, generate a blockchain transaction $Tx_2$ which comprises an unspent output (UTXO) and spends an output of a previous transaction $Tx_1$.

The output of previous transaction $Tx_1$ may comprise a locking script which includes an identifier associated with a first state of the DFA, and the unspent output (UTXO) of transaction $Tx_2$ may comprise a locking script which includes a further identifier associated with a further state of the DFA. The identifier can be any form or format of label, tag or means for identifying the state. It can comprise a portion of data, such as metadata, or a cryptographic key.

The program may comprise the identifier associated with the first state of the DFA. The program may be arranged to generate and/or execute a further program which comprises the further identifier which is associated with the further state of the DFA and included in the UTXO of the further transaction $Tx_2$.

The DFA may model or represent the execution of a (machine executable) smart contract. The smart contract may be generated by a computer-based resource by populating a template contract with parameters. Thus, the contract generation may be automated.

The method may comprise the step of determining a state transition table for the DFA and storing the state transition table in a computer-based storage resource.

The program may be arranged to generate the blockchain transaction $Tx_2$ responsive to the input signal by:
using the identifier in the locking script of blockchain transaction $Tx_1$ to determine the current state of the DFA;
using a state transition table for the DFA to determine the further state and its associated identifier, based on the current state and the input signal.

The method may comprise the step of submitting the blockchain transaction $Tx_2$ and/or previous transaction $Tx_1$ to a blockchain network.

A plurality of programs may be generated and executed, each program comprising an identifier for uniquely identifying a state of the DFA. Thus, a series of programs (scripts) may be used to execute the contract, each script having a lifetime substantially corresponding to the duration of the state i.e. how long the DFA is or may be in that given state.

The unspent output (UTXO) of the transaction ($Tx_2$) and/or the output of the previous transaction ($Tx_1$) may comprise a locking script which includes a hash of a puzzle, the solution of which must be provided by an input of another blockchain transaction in order to spend the output(s) and transition the DFA to another state.

The unspent output (UTXO) of the transaction ($Tx_2$) and/or the output of the previous transaction ($Tx_1$) may comprise a locking script which includes a hash of a redeem script which must be provided by an input of another transaction in order to spend the output (UTXO) and transition the DFA to another state. The redeem script may comprise a cryptographic key.

The states of the DFA may be represented by unspent outputs (UTXOs) in transactions on the blockchain. Spending a given UTXO may represent a transition to a different state. The states, actions, conditions and triggers may be provided in a transition table for the DFA and/or encoded in software.

The invention may provide a system arranged to implement, realise or incarnate a software-based DFA. It may do this via a blockchain. It may comprise:
a blockchain; (this may or may not be implemented using the Bitcoin network) one or more computing agents arranged to generate and/or execute at least one program in accordance with any method step(s) described above or hereafter;
and a storage resource for storing the state transition table for the DFA; this may be, for example a hash table or distributed hash table; and/or
at least one template for a blockchain transaction and/or at least one template for the smart contract.

The invention may be substantially as described in the following section entitled "compiling and executing the Software-Implemented DFA" although feature(s) from other sections of the description may also apply.

The system may be arranged to implement or realise a state machine on a blockchain perform so as to perform an automated execution of a (smart) contract.

Any feature mentioned in relation to a system of the invention may also be applicable to a corresponding method of the invention, and vice versa. Any feature mentioned herein in relation to one aspect or embodiment of the invention may also apply to any other embodiment or aspect.

The blockchain-based DFA of the present invention incorporates at least the following key features:

- Provides a blockchain-based implementation of a mathematical model of computation conceived as an abstract machine that can be in one of a finite set of states, and can change from one state to another (transition) when a triggering event of a finite set (called input) occurs
- provides a novel technology for the establishment and automated execution of contracts based on the technical realisation of the commitments of different parties as a Deterministic Finite Automaton (DFA) embodied in a computational and storage structure on a blockchain platform
- Can use an existing blockchain infrastructure and protocol
- Enables and facilitates automated generation, control and performance of a smart contract
- Executable and enforceable automatically by computers.
- Permanent, immutable record of contracts, their execution and outcomes.

The invention provides and harnesses at least the following benefits, which are inherent to blockchain protocols and platforms:

- Inherently secure by design (the Bitcoin protocol requires no trusted parties).
- Distributed, so avoids a large single point of failure and is not vulnerable to attack.
- Easy to manage and maintain (the Bitcoin network is straightforward to use)
- Inexpensive (just a small transaction fee is usually expected under the Bitcoin protocol)
- Not geographically limited or restricted—can be used anywhere and at any time by anyone with access to the Internet
- Transparent, once data has been written to the blockchain, anyone can see it.
- Immutable, once data has been written to the blockchain, no one can change it.
- Privacy is maintained, no personally identifying information is involved.

These and other aspects of the present invention will be apparent from and elucidated with reference to, the embodiment described herein. An embodiment of the present invention will now be described, by way of example only, and with reference to the accompany drawings, in which:

FIG. 2 shows an illustrative embodiment of the invention wherein a smart contract is executed as a DFA implemented on a blockchain using P2PKH Transactions to represent the various state transitions that are triggered.

FIG. 3 illustrates a blockchain-based DFA as per the example discussed below.

FIG. 4 shows an example of an origination (to state $s_0$) transaction (o) for the puzzle-based implementation described below.

FIG. 5 shows an example of a transition (from state $s_0$ to state $f_j$) transaction ($t_j$).

FIG. 6 shows an example of a completion (from state $f_j$) transaction ($c_j$).

FIG. 7 shows a blockchain transaction which is analogous to that in FIG. 4 but using the P2SH transaction type for the DFA states.

FIG. 8 shows an example analogous to that in FIG. 5 but using the P2SH transaction type for the DFA states.

FIG. 9 shows an example which is analogous to that of FIG. 6 but using the P2SH transaction type for the DFA states.

FIG. 10 is a State diagram for the bond of example 1 of a Codification technique which may be used in accordance with an embodiment of the invention. It shows the states (blobs) and the transitions (connecting lines) associated with the indicated inputs.

FIG. 11 shows a State diagram of the coupon bond of example 2 with a recurrent state.

FIG. 12 shows the internal state diagram of the recurrent state in relation to the example of FIG. 11.

FIG. 13 shows a state diagram for the European call option example of the "compilation and execution" section of the present application, showing the states (blobs) and the blockchain transactions (triangles) to be submitted: origination (o), transitions (t) and completions (c).

Figure 1:
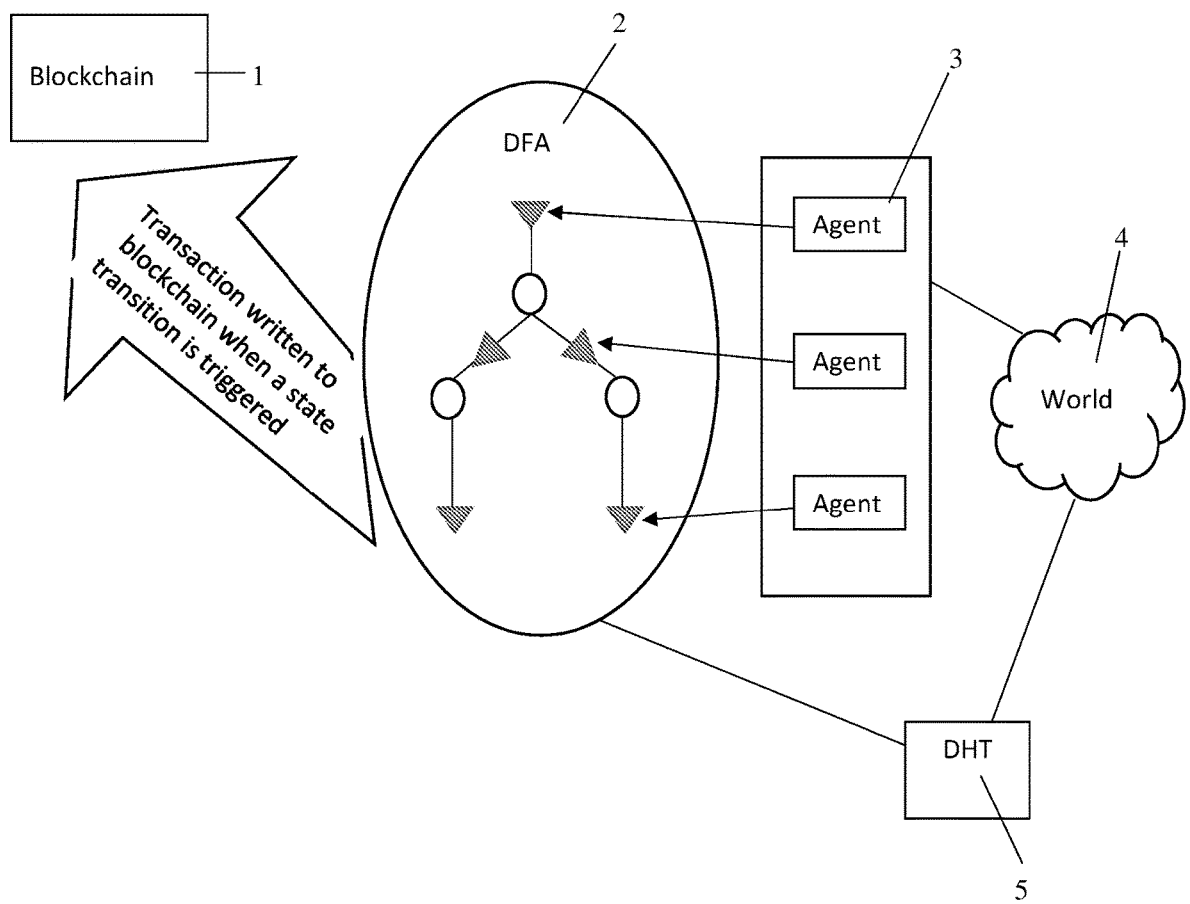
FIG. 1 illustrates an overview of a system arranged in accordance with an embodiment of the invention.

In this document we use the term 'blockchain' to include all forms of consensus-based electronic, computer-based distributed ledgers, including, but not limited to blockchain and transaction-chain technologies, permissioned and unpermissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

An illustrative embodiment of the invention comprises a definition for a DFA that models a process or task, such as a contract, and a related system of computing resources which may be referred to as agents or "bots". The agents are arranged to generate the transactions and submit them to the blockchain. However, the invention is not limited to use in relation to contracts.

Turning to FIG. 1, the invention provides the realisation of a process as an abstract DFA incarnated on a computing platform—blockchain—comprising hardware and software components. FIG. 1 provides an overview of a system arranged in accordance with an illustrative embodiment of the invention. The system comprises computing agents 3 capable of interaction with other entities 4 (e.g. humans or other computers) to receive instructions. These instructions might be, for example, which smart contract to create and execute. Thus, the computing agents 3 interact with the physical world to implement the invention by responding to, and causing, events outside themselves in the "real world".

The specification of the contract itself can be provided in any machine-executable format, e.g. xBRL and stored in a secure and decentralized manner, for example in a distributed hash table (DHT) 5 on the torrent network. From the specification of the contract a computing agent constructs the DFA 2, which is subsequently incarnated on the blockchain 1 by one or more agents.

The DFA 2 itself is specified as a finite set $\{S, I, t, s_0, F\}$, where S stands for the (finite) set of possible states in which the contract/DFA can be; I is a (finite) set of inputs (also known as the alphabet), which in our context means any event or condition which can occur in relation to the contract, e.g., a payment is made, the maturity of the instrument is reached, a counterparty defaults, etc.; in our mechanism these input signals are received/produced by one or more agents, and which then determine the next state of the system (possibly the same one).

The third component of a DFA is a transition function t: S×I→S. The term "Deterministic" in "DFA" refers to the uniqueness of the decision: given a state and an input there is only one new state (possibly the same one). Thus, given an initial state ($S_0$) and a history of inputs the outcome of the calculation (contract) is unique, one among the set of all possible final outcomes (F⊆S). Once all these elements have been established, the DFA is completely defined by a transition table, specifying the future states for all possible current states and input signals. The states of the DFA are themselves associated with unspent transaction outputs (UTXO) on the blockchain. As is known in the art, the Bitcoin network continuously tracks all available UTXO. In accordance with the invention, the mechanism by which the DFA moves from one state to another is incarnated (implemented) in accordance with the invention by blockchain transactions. Effectively, a transaction on the blockchain spends the UTXO associated with one state (an input of a previous transaction) and creates the UTXO associated with the next state (an output).

Simple DFA Example: Discount (Zero-Coupon) Bond

For the sake of illustration, we now consider a discount (zero-coupon) bond, which is a simple debt instrument usually bought at a price (normally at a discount with respect to its face value), then held for some time until its principal is returned at maturity. Thus, a coupon bond is a debt obligation with periodic interest payment (coupons) that the holder receives from the issuance of the contract until its maturity when, in addition to the last coupon, the principal of the bond is paid as well.

The possible states we will consider are S={$s_0$, $f_0$, $f_1$}, indicating, respectively, the holding state ($s_0$), the normal conclusion of the contract (if it follows the happy path) or happy ending ($f_0$), and a state ($f_1$) in which things go wrong, e.g. litigation. The final states of the system are thus F={$f_0$, $f_1$}. The alphabet we will consider is I={r, d, e}, indicating, respectively, repayment of the principal at (or before) expiration (r), default of the issuer at (or before) expiration (d), and expiration of the contract without repayment (e). The transition matrix for this simple contract is presented in Table 1.

TABLE 1 transition table for a DFA representing a zero-coupon bond.

| t | r | d | e |
|---|---|---|---|
| $s_0$ | $f_0$ | $f_1$ | $f_1$ |

It should be noted that the final states represent the completion of the contract, thus no further states need to be specified from them (currently noted as '-' in the transition table, although those lines could be omitted). In principle, more states and/or inputs (as well as actions) could be defined for this instrument, but this has not been done in this document for the sake of simplicity and clarity, to illustrate the fundamentally inventive aspects of the invention rather than injecting distracting detail relating to the complexities of the contract.

FIG. 3 represents the embodiment of the zero-coupon bond DFA on the (Bitcoin) blockchain. The states are represented by circles and the Bitcoin transactions which move the machine from one state to the other by the blue triangles. Note that the inputs received by the agents are omitted in FIG. 3, however in each state one or other transition should occur according to these inputs, which is reflected in the diagram by the construction of one or other Bitcoin transaction (e.g., $t_0$ or $t_1$ in state $s_0$); no transactions are required for transitions which do not change the state, thus they have been omitted. In addition to the transitional transactions of the DFA ($t_i$), an initial origination transaction (o), and transactions corresponding to the completion of the contract ($c_i$) are considered.

We now turn our attention to the flow of funds in the transactions (originations, transitions and completions). An important observation is that because of the finite nature of the DFA, and of (financial) contracts, the process will be completed after a number of transitions. This necessarily implies (assuming some finite fees for the computing agents involved and the Bitcoin miners) that the maximum costs of the establishment and execution of the contract is bound and can be determined in advance, e.g. at the point of establishment of the DFA. It is given by the total amount of funds required to execute the contract following the longest imaginable path. This, of course, excludes the possibility of infinite loops in the execution, note however that this is not relevant for current (financial) contracts, even contracts such as perpetuities are bound to be completed at some point in the future, despite their name; for example, when the indebted entity ceases to exist or the payments become negligible due to inflation.

The particular distribution of the fees, how much each agent receives for their work, although of practical significance is not a key element of the present invention. Continuing with our example of a streamlined zero-coupon bond, we will arbitrarily assume a fee of 3 mBTC for the origination transaction (o), a transition fee ($t_i$ transaction) of 1 mBTC, and a 2 mBTC fee for the completion transaction ($c_i$); note that these fees are automatically included in the transactions themselves. Together with 3 mBTC of total mining fees for the 3 transactions, this results in a total maximum cost of 9 mBTC. In our very simple example, the length of all paths is equal. Thus the final cost of the contract will certainly coincide with its maximum cost. Since this need not be the case in general, in order to completely illustrate a general flow of funds, we will assume that the funds provided for the execution of the contract are 10 mBTC, and that 1 mBTC is returned to the same source of funds after completion. This takes the place of eventual unused funds at completion, i.e., if maximum and used funds were to differ.

We will assume that the funds for the establishment and execution of the contract (10 mBTC) are initially provided by some funding source referred to as the 'originator'. As mentioned, in our example this source will also receive 1 mBTC unused funds after completion. In principle, one could also include additional inputs and outputs of funds in the transactions, e.g. the price paid for the zero-coupon bond, the repayment of the principal, or any other imaginable transfer of funds. Although this may be of practical interest, at this point it would only serve to obscure the essential elements of the present invention. For the sake of clarity, such details have not been included in the examples below. It should be noted, however, that the structure is completely general and such possibilities are not excluded.

Illustrative Implementation of A Technical Solution—DFA System and Method

The skilled person will readily appreciate that the system could be implemented in a variety of ways, with those variations still falling within the scope of the present invention. For example, the configuration and architecture of the agent system 3 can be varied e.g. whether the particular agents involved are known in advance, or not. We will consider two technical design options here for the sake of illustration.

1. If participation on the contract is kept relatively open so that a variety of computing agents can participate, a structure based on the standard blockchain transaction of the type "transaction puzzle" is possible
2. Conversely, if the transactions for each state can be assigned in advance to a particular agent (or group of agents), a pay-to-script-hash (P2SH) transaction can be used.

Puzzle-based blockchain transactions and P2SH transactions are known in the art of blockchain technology. The skilled person will also understand that a number of possibilities may exist in addition to, or alternatively to, the above two options. For example, an embodiment may use a plurality of agents which change in time, and/or a hierarchy of agents etc. The possibilities are many but we will only describe two options herein, from which the skilled person will readily derive other possible variations and implementation options.

It should be noted, however, that the type of blockchain transaction used in an embodiment is not essential to the present invention, as the party which provides/receives the funds in the transactions (the issuer, the purchaser, the payee, etc.), is not fundamental to the invention. Instead, a key element of the invention is that at any point in time the state of the task/contract is defined within the blockchain, and that it provides a mechanism (whatever its detailed concrete realisation) which enables automated generation of the contract, execution of it on the blockchain, and enforcement of the appropriate outcome according to the sequence of events that occurs. Note that, because the whole mechanism is embodied on the blockchain, it inherently provides a permanent immutable record of the history and outcome of the contract, among many other advantages.

Implementation Option 1: Transaction-Puzzle Approach

In one possible embodiment of the invention, the system of agents 3 is arranged as an open network of computers in which anyone with some Internet-connected processing power may join and may provide some processing power to the system (e.g. a provider of the establishment and execution of the blockchain-based DFA contracts) and be rewarded for their resources. In such situations, it is not possible to know in advance which particular agent will submit the transaction to the blockchain, i.e., it is not possible to use any specific information on the agent (e.g. its public keys). However, a transaction-puzzle type is suitable for use in such situations. The general locking/unlocking mechanism of this type of transactions is:

Locking Script: OP_HASH256 <state $s_i$ puzzle> OP_EQUAL

Unlocking Script: <puzzle $s_i$ solution>

Where <state $s_i$ puzzle>=HASH(<state $s_i$ puzzle solution>) and the puzzle solution itself can include any desired information, including a code for the contract, the label of the state, and any other desired information, for example some salt for added security:

<state $s_i$ puzzle solution>=HASH (<contract code; state $s_i$; other data; salt>)

The concept of 'salt' is known in the prior art and would be readily understood by the skilled person in the content of the present invention. The sequence of actions is as follows, with reference to FIGS. 1 and 2. First, the agent system (3, step 101) creates the DFA structure 2.

The transition table specifies and comprises the trigger events which will move the DFA from one state to another. The transition table comprises at least one trigger event or condition for each possible state transition. Thus a trigger is associated with a current state i.e. the state from which the DFA will move after this trigger event, and a new state i.e. the state that the DFA will be in after the transition which the trigger initiates.

At step 102 FIG. 2, the puzzles for each possible state of the DFA are created, possibly by computing agents. The transition table and its associated puzzles for each transition is stored externally. This may be in some sort of database or a DHT. The puzzles are distributed securely to the agents which are allowed to participate in the execution of the contract. There is a number of possibilities for how this distribution can be achieved. In a preferred embodiment, these steps are performed by the computing agent(s) in an automated fashion, without the need for human intervention.

At step 104, an agent creates the origination transaction to state $S_0$. This may be as shown in FIG. 4. The funds allocated to the contract have been assumed to be 10 mBTC, the agent fee 3 mBTC, and the outgoing funds for further processing of the contract 6 mBTC (1 mBTC mining fee is implicit). At this stage the contract is incarnated as a structure on the blockchain and is in its first state $s_0$, i.e., there is an UTXO associated with the state so of the particular contract on the blockchain.

In the illustrative transaction of FIG. 4, the funds allocated to the contract have been assumed to be 10 mBTC, the agent (botnet) fee 3 mBTC, and the outgoing funds for further processing of the contract 6 mBTC. A 1 mBTC mining fee is implicit.

As can be deduced by studying the transaction of FIG. 4, the original funding for the contract is received (from the 'originator' in the example) by a P2PKH-type transaction; output 0 (puzzle-based) can be unlocked by any agent in possession of the puzzle solution; and output 1 (P2PKH) pays the required fee to the agent 3 which has succeeded in placing the transaction on the blockchain.

Successive transitions upon execution of the contract are carried out by automated agents 3 in a similar fashion as exemplified in FIG. 5. The agents are arranged to obtain, generate or receive the puzzle solution corresponding to the current state ($s_0$). They also interact with some entity or entities (e.g. some other computer in the agent system, or some data/signal source) in order to receive the appropriate input, read the transition table (or just the part of it corresponding to the current state), and get the puzzle corresponding to the appropriate next state ($f_j$). The agent can then submit the transaction to the blockchain. If the transaction is validated by the blockchain network, the agent will receive the relevant fee and the DFA will be in the state $f_j$. In the transition of FIG. 5, the incoming funds have been assumed to be 6 mBTC, the agent fee 1 mBTC, and the outgoing funds for further processing of the contract 4 mBTC (1 mBTC mining fee is implicit).

FIG. 6 shows the structure of the last of the possible transactions, namely those completing the execution of the contract ($c_j$). In FIG. 6, the input section follows the same transaction puzzle logic as before, while output 0 pays the unused funds back to the originator (1 mBTC, as discussed above), and output 1 pays the fee to the agent. In FIG. 6, the incoming funds have been assumed to be 4 mBTC, 1 mBTC unused funds are returned to the originator, and the agent fee is 2 mBTC (a 1 mBTC mining fee is implicit).

Implementation Option 2: P2SH-Based Transaction

The puzzle-based approach described in option one is suited for use wherein there is a large number of a-priori unknown participants. However, in other cases a limited or acceptably small number of acknowledged computing agents 3 may be designated for use in conjunction with the invention. In this case, transactions of the type P2SH might be more appropriate for use since they can be configured to include the public keys of the known agents 3, thereby providing an extra layer of security. In the case of a single acknowledged agent, a feasible locking/unlocking mechanism for the transactions is:

Locking Script: OP_HASH160 <state $s_i$ redeem script hash> OP_EQUAL

Unlocking Script: OP_0 <agent signature> <state $s_i$ redeem script>

Redeem Script: OP_1<state $s_i$ metadata> <agent public key> OP_2 OP_CHECKMULTISIG It should be noted that that this can be extended to a larger number of acknowledged agents by including their signature as well. As before, the metadata of a state $s_i$ can include any desired information, for example:

<state $s_i$ metadata>=HASH (<contract code; state $s_i$; other data>)

The sequence of actions is similar as in the previous case for the puzzle-based approach. First, the agent system 3 creates the DFA structure, stores the transition table externally (e.g. in a DHT). It is then determined which agents will process the transactions and retrieve/generate their public keys, which are then included in the redeem scripts for each possible state of the DFA. It should be noted that these scripts can be stored externally (off the blockchain) and need not be transmitted securely. Next, a computing agent creates the origination transaction as specified in FIG. 7. The example of FIG. 7 is analogous to FIG. 4 but uses the P2SH transaction type for the DFA states.

At this stage the contract is incarnated as a structure on the blockchain and is in its first state $s_0$. The only change in the transaction with respect to that in FIG. 4 is output 0, which now is of type P2SH and includes the public keys of the acknowledged agents as discussed above.

Although the changes are analogous, for completeness FIGS. 8 and 9 provide examples of transition transactions and completion transactions based on the P2SH transaction type. The flow of funds is the same as before. FIG. 8 shows an example analogous to that in FIG. 5 but using the P2SH transaction type for the DFA states. FIG. 9 shows an example which is analogous to that of FIG. 6 but using the P2SH transaction type for the DFA states.

a Novel Codification Technique for a Computer-Implemented DFA

Having described a blockchain-based DFA above, we now turn our attention to a particularly advantageous and novel aspect of the invention. In this section, we describe a novel and inventive technique for codifying the state of the DFA into a computer-readable and executable form.

In the conventional way of regarding such a machine, states are defined statically (a priori) and represent some particular configuration of the system or have some particular meaning. For example, they can be given a set or names, be associated with a set of tags, or with a set of unspent transaction outputs (UTXO) as explained above for a blockchain-based DFA. This is enough for the system to work, since the (output of) computation itself is determined by how the system moves between states while it accepts the chain of inputs.

In this sense, a DFA (i.e. the sets of states, transitions, etc.) is not unique and two DFA can be equivalent, i.e. produce the same output for each given chain of inputs, even though it is possible that the interpretation conceived a priori for the states is very different. Consider cases where, for example, they are deployed on different physical machines or conceived for solving different problems. This also leads naturally to the concept of DFA minimization (see https://en.wikipedia.org/wiki/DFA_minimization).

Although the static determination (tagging) of states is enough for the abstract functioning of the state machine itself, and enough for many problems in which only the output of the calculation is relevant, there are cases in which the meaning of the states themselves is of practical importance and cannot be inferred from the tags of the states. This might be, for example, because it is purposely hidden for privacy or confidentiality reasons. An example can also be found in cases in which the computation is distributed and carried out by computing agents which (purposely) do not have complete information on the system. In these cases a dynamic determination of the state of the system is necessary, at run time.

An advantageous aspect of the present invention described herein is a codification technique which allows the dynamic (on-the-fly, at run time) determination of the state of a DFA. Such DFA may include those associated with the distributed execution of a contract as described above, but not exclusively so, and the invention is not limited with regard to the purpose of the DFAs that the inventive technique is used with or their specific implementations. As the conventional approach is to pre-define the states in a static fashion, the dynamic state determination of the invention runs counter to traditional methodology and offers a completely different technical solution to those known in the art. It goes beyond there mere use of the blockchain for storing data about events that have occurred.

For the description and illustration of the inventive codification technique we will use as examples a coupon bond and a perpetuity, although the invention is by no means limited to these example uses or applications. It is equally applicable to non-financial applications and contexts. The nature of a coupon bond has been explained above. A perpetuity is a stream of payments with no end, i.e. the coupon payments continue, in principle, forever. In practice, though, due to the effect of positive interest rate compounding, at some point the amount of the coupons is of no practical significance so that the discounted value of the contract is, in reality, finite.

EXAMPLE 1 OF THE INVENTIVE CODIFICATION TECHNIQUE—STRAIGHTFORWARD SCENARIO

As already explained, a DFA consists of the finite sets {S, I, t, $s_0$, F}, representing respectively the possible states (S), inputs (I), transitions (t), initial state ($S_0$), and final states (F), also called accepting states. In addition, a set of actions (a) can be defined which represent side effects of the execution and do not determine the output of the computation.

For the description and illustration of the invention we will consider a 3-period coupon bond. The elements (and notation) of the DFA that we will consider for such a contract can be statically defined as given in Tables 2 to 4. Note that the initial state is designated by S in our notation and the accepting states are $F_0$ and $F_1$.

TABLE 2

List of contract states for the coupon bond:

| State | Description |
| --- | --- |
| S | Contract stablished and signed, execution not started. |
| $T_1$ | Execution started, waiting for date of first coupon payment. |
| $C_1$ | First coupon payment due, waiting for payment. |
| $T_2$ | Second period, waiting for date of second coupon payment. |
| $C_2$ | Second coupon payment due, waiting for payment. |
| $T_3$ | Third period, waiting for date of second coupon payment. |
| $C_3$ | Third coupon payment due, waiting for payment. |
| P | Principal repayment due, waiting for payment. |
| $F_0$ | Ending (accepting) state, happy ending. |
| $F_1$ | Ending (accepting) state, default occurred. |

TABLE 3

List of contract inputs (event alphabet) for the coupon bond.

| Input | Description |
| --- | --- |
| t | Clock signal: the date of next payment has been reached. |
| p | A payment has been made. |
| d | A default has occurred (payment not made). |

All of these inputs can be detected and determined by a computer in an automated fashion. In the above example of table 3, it is possible for a computer to check whether a certain date/time has been reached, or whether a certain payment has/has not been made via a blockchain transaction. The blockchain can be traversed to check whether there is a transaction making the payment on the ledger. As the Bitcoin blockchain provides a permanent, public and tamper-proof record, this verification can be conducted by a computing agent without the need for human intervention.

TABLE 4

List of contract actions for the coupon bond.

| Action | Description |
| --- | --- |
| $a_0$ | Send notification of payment. |
| $a_1$ | Send notification of default (e.g. to lawyers). |
| $a_2$ | Send notification of completion of the contract. |

Once these elements have been defined, the functioning of the system can be completely specified by the state transition table, in which the current (initial/from-) state of the system (rows) together with the appropriate input (columns) determine, according to the table, the next (final/to-) state of the system as well as the actions to be carried out in parallel to the transition. For our example this is given in Table 5. Note that the execution is understood to start in the initial state (S), and the only possible final (accepting) states are $F_0$ and $F_1$. Since these states mark the finalization of execution i.e. there is no transition associated with them, they can be omitted from the rows of the table. An alternative format for the transition table is given in table 5.

TABLE 5

State transition table of the coupon bond. When the system is in a particular state (row) and a particular input (column) occurs, it transitions to the indicated state and carries out the indicated actions (state/actions); a hyphen indicates that the input is irrelevant for the given state, i.e. it does not apply to the state.

|  | t | p | d |
| --- | --- | --- | --- |
| S | $T_1$ | — | — |
| $T_1$ | $C_1$ | — | — |
| $C_1$ | — | $T_2/a_0$ | $F_1/a_1$ |
| $T_2$ | $C_2$ | — | — |
| $C_2$ | — | $T_3/a_0$ | $F_1/a_1$ |
| $T_3$ | $C_3$ | — | — |
| $C_3$ | — | $P/a_0$ | $F_1/a_1$ |
| P | — | $F_0/a_2$ | $F_1/a_2$ |

Another, equivalent way of specifying the functioning of the state machine is the so-called state diagram, in which the states of the system are represented by blobs, the input and actions are given by the attached labels, and the transitions are represented by the connecting arrows; for our example it is given in FIG. 10. Note that the final (accepting) states $F_0$ and $F_1$ are, by convention, indicated with a double line for the blob. For simplicity, since they are not relevant for the execution of the system, the actions have been omitted from this diagram. The meaning of the dashed box (recurrent states) will be clarified below.

As stated above, although not strictly necessary for the functioning of a DFA, a dynamic determination of the state of the system which is both human and computer readable can be a practical necessity and constitutes an aspect of the invention described herein. Each state is characterized by a unique set of conditions that either do or do not ensue, or are irrelevant for the particular state. Each condition must be something explicit and (machine) testable. In other words, there must be a definite, computational way to tell if the condition ensues or not. In this way, an embodiment of the invention may interact with the physical world, or at least a world external to the computer on which the software is executing, in that values or inputs for the tests may be received from one or more external sources. For example, once a date is reached, or a temperature threshold is exceeded as indicated by a sensor, or a notification is received from another computer, etc. These conditions may be tested by the computing agents described above.

In our example this can be achieved by the set of conditions presented in Table 6, in which the states to be tested are given in rows and the conditions we have defined are given in columns. Each t condition indicates whether a particular date has arrived. For example, the condition denoted t0 means t>$t_0$), and each ci (or p) condition whether the corresponding payment has been made. Note that the payment of coupons (or principal) which are not yet due are irrelevant for states occurring before the corresponding maturities have been reached.

Of course, whether this or an equivalent set of conditions is used is irrelevant as long as they uniquely determine all possible states, i.e. the chain of True, False or irrelevant values for each state is unique. It should also be noted that, although in this example we have considered only binary (True or False) or irrelevant conditions, these could in principle take multiple values. In addition, besides atomic conditions as considered here, each condition could in turn represent a composed condition, made out of several (sub) conditions in turn. All these variations would be readily apparent to the skilled person and fall within the scope of the present invention.

A last point to address is the meaning of the dashed box in FIG. 10. Although as it stands the diagram is perfectly valid and should describe correctly the dynamics of the coupon bond, note that there is an intriguing similarity among states $T_i$ and states $C_i$; as they are very similar in meaning, differing only in the number of the time period or coupon to which they refer (i). Therefore, they could also be represented by a common repeating or recurrent state, plus additional information indicating to which coupon/period they refer. This can be naturally extended to states with repeat themselves indefinitely, thus opening the possibility for the codification of perpetuities. The definition of a codification scheme with such recurrent states will be addressed in the next section below.

TABLE 6

State definition table. Each condition can be true (T), false (F), or irrelevant (—) for a particular state, which is thus defined by this set of dynamically testable values.

| State | t0 | t1 | c1 | t2 | c2 | t3 | c3 | P |
|---|---|---|---|---|---|---|---|---|
| S | F | F | — | F | — | F | — | — |
| $T_1$ | T | F | F | F | — | F | — | — |
| $C_1$ | T | T | F | F | — | F | — | — |
| $T_2$ | T | T | T | F | F | F | — | — |
| $C_2$ | T | T | T | T | F | F | — | — |
| $T_3$ | T | T | T | T | T | F | F | — |
| $C_3$ | T | T | T | T | T | T | F | — |
| P | T | T | T | T | T | T | T | F |

EXAMPLE 2 OF THE INVENTIVE CODIFICATION TECHNIQUE—RECURRENT STATE

As mentioned above, some subsets of the states of the coupon bond DFA from last section or the coupon-bond (the $T_i$ and $D_i$ states) correspond to very similar interpretations of the status of the state machine, differing only in the number of the time period or coupon to which they refer (i); i.e., in a certain sense they can be regarded as a state that repeat itself a number of times (say from i=1 to a given imax, with imax=3 in our case). Given this, it makes sense to simplify the representation of DFA by including all those states in a recurrent state (R) to be treated separately. With this simplification we present below the list of contract states (Table 7), the state transition table (Table 8), the equivalent state diagram (FIG. 11), and the state definition table (Table 9) of the DFA for our example coupon bond; note that the other elements of the DFA (inputs and actions) do not change with respect to the previous section.

TABLE 7

List of contract states for the coupon bond with a recurrent state.

| State | Description |
|---|---|
| S | Contract stablished and signed, execution not started. |
| R | Recurrent state, dynamics of coupon expiration and payment. |
| P | Principal repayment due, waiting for payment. |
| $F_0$ | Ending (accepting) state, happy ending. |
| $F_1$ | Ending (accepting) state, default occurred. |

TABLE 8

State transition table of the coupon bond with a recurrent state

|   | t | p | d |
|---|---|---|---|
| S | R | — | — |
| R | — | $P/a_0$ | $F_1/a_2$ |
| P | — | $F_0/a_2$ | $F_1/a_2$ |

TABLE 9

State definition table. Each condition can be true (T), false (F), or irrelevant (—) for a particular state, which is thus defined by this set of values, one for each condition (note that, in turn, a condition can have multiple components).

| State | t | r | p |
|---|---|---|---|
| S | F | F | — |
| R | T | F | — |
| P | T | T | F |

Of course all this merely hides the complexities of the bond dynamics inside of the recurrent state, which has to be specified separately. This simplification can be important, however, in the case of complex state machines. An obvious analogy is that of the introduction of loops in programming languages. The recurrent state itself is also defined as a state machine, note however that initial and accepting states are replaced in this context by entry and exit points, since the execution of the abstract computation is not meant to start or finish inside the recurrent state. We present below the list of contract states (Table 10), the state transition table (Table 11), and the state diagram (FIG. 12) for the recurrent state.

TABLE 10

List of contract sub-states for the recurrent state:

| State | Description |
|---|---|
| T | Period started, waiting for date of next payment. |
| C | Coupon payment due, waiting for payment. |

TABLE 11

Internal state transition table of the recurrent state:

|   | t | p, i < imax | p, i = imax | d |
|---|---|---|---|---|
| T | C | — | — | — |
| C | — | $T/a_0$, i = i + 1 | exit $p/a_0$ | exit $F_1/a_2$ |

A novelty of this approach is the introduction of an index (i), which keeps track of how many times the states have been occupied. The increase of this index, and analogous quantities (for example the total amount of money paid), can be either calculated externally (as below for the codification scheme), or achieved by additional DFA actions, as indicated in Table 11 for the state C. Note as well that the inputs (alphabet) for the internal states of this recurrent state can potentially depend on the internal index (i) and/or similar quantities. As explained before, the would-be accepting states of the system have been replaced by exit points. The corresponding equivalent state diagram is presented in FIG. 12.

The codification scheme for such a recurrent state would look, when expanded, very similar to the relevant parts of Table 5. However, since the spirit of this approach is not to expand and treat each internal (sub-) state separately, it seems more natural no to present it explicitly in a table. Instead, we present in FIG. 4 the pseudocode for an algorithm which would assign the correct vales (True or False) to the variables associated with the conditions of the state machine codification. Variables associated with irrelevant conditions do not need to be assigned any value, of course. In FIG. 4, as in Table 5 above, each ti condition indicates whether a particular date has come (that is, ti=T means $t \geq t_i$), and each ci condition whether the corresponding (i-th) coupon has been paid.

Below, we provide the pseudocode of an algorithm which assigns appropriate values to the variables associated with the conditions of the codification scheme for the internal states of the recurrent state.

```
i=0
while (i < imax)
    i = i+1
    if (t >= t_i)
        ti = T
        if (c_i paid)
            ci = T
        else
            ci = F
    else
        ti = F
```

A last point to be addressed is the need for a termination point, represented by the index imax. Although usual coupon bonds do have a finite maturity, perpetuities are similar instruments which, in principle, run for ever. With our codification technique of the recurrent state this can be achieved by a simple modification of the pseudocode as presented below. Note that in this case the while loop will end when it encounters the first period which maturity has not been reached, of course these variables are irrelevant and at that point all the states are uniquely defined by the codification technique, i.e. there is a combination of true and false values unique to each state. The following pseudocode is for a perpetuity.

```
i=0
while (true)
    i = i+1
    if(t >= t_i)
        ti = T
        if (c_i paid)
            ci = T
        else
            ci = F
    else
        ti = F
        exit
```

TABLE 11

Alternative format for the state transition table of the coupon bond in table 5:

| From | To | input/actions |
|---|---|---|
| S | $T_1$ | t/— |
| $T_1$ | $C_1$ | t/— |
| $C_1$ | $T_2$ | $p/a_0$ |
| $C_1$ | $F_1$ | $d/a_1$ |
| $T_2$ | $C_2$ | t/— |
| $C_2$ | $T_3$ | $p/a_0$ |
| $C_2$ | $F_1$ | $d/a_1$ |
| $T_3$ | $C_3$ | t/— |
| $C_3$ | P | $p/a_0$ |
| $C_3$ | $F_1$ | $d/a_1$ |
| P | $F_0$ | $p/a_2$ |
| P | $F_1$ | $d/a_2$ |

Compiling and Executing the Computer-Implemented DFA

Herein we describe a novel technology for the establishment (compilation) and execution of contractual agreements based on the realization of the commitments of the different parties (and other clauses and provisions) as a computational structure modelled as a state machine.

In this section, we describe an advantageous technical aspect of the system regarding the establishment and execution of such a smart contract via a blockchain. This deals with the flow of information between the different (computer) agents which will effectively implement the contract. Very generally, we will refer to this system as a 'botnet' (a collection of computing agents), often without specifying which agent actually carry out the actions described. The skilled person will understand that there are many ways in which such implementation details could be put into effect.

As mentioned, we will use the contract for a European call option as an example to illustrate this aspect of the invention. A European call option is an agreement that gives an investor the right, but not the obligation, to buy a stock, bond, commodity or other asset at a specified price (strike price) on a specified date (exercise date). The writer (seller) of the option commits himself to sell the asset to the holder (buyer) on that date, at that price, if the buyer decides to exercise it, which (rationally) happens if the price of the asset on that date is higher than the strike. Given this, we assume that the contract can alternatively be settled by the payment to the holder of an amount equal to the market price of the asset on the exercise date minus the strike, no payment is needed otherwise and the option expires unexercised.

The standard way of establishing and executing a (financial) contract is to sign a legal document and have its provisions interpreted and executed, and sometimes contested, by humans. These contracts can be regarded as composed of text, defining the terms, and a set of values for the parameters particular to the contract at hand e.g. exercise date, writer, public keys, etc. These distinct elements have been separated in our system, where the essence of the contractual text is captured as an abstract machine, a DFA, and the set of values for the parameters of the particular instance of a contract is provided independently—as described above.

Turning to our example, the DFA computational system consists of the finite sets $\{S, I, t, s_0, F\}$, representing respectively the possible states (S), inputs (I), transitions (t), initial state ($s_0$), and final states (F), also called accept states. In addition, and not essential to the DFA structure itself, we consider here a set of actions (a) which the agents are required to carry out in parallel to submitting the transactions. In the following, as is conventional, the current time (date) will be noted by t, the maturity date by T, the price of the asset at maturity by $S_T$, and the strike price by K.

The main focus in this section of the application is the establishment of computer agents associated with the states of the DFA machine. These are implemented as computing resources comprising scripts. It should be noted that the term "script" should not be confused in this context with a script of a blockchain transaction, such as an unlocking or locking script. Here, the term "script" is used in the more general computing sense. The skilled person would readily understand this and interpret the term's meaning from the context.

The agents (scripts) are able to change the state, implement a transition, and in parallel spin-off other sets of scripts associated with the subsequent state. The dynamic i.e. run time identification of a DFA state with a computer script with the appropriate capabilities is the main inventive element of this aspect of the invention. For our streamlined example, the possible states of the contract and sufficient conditions for their definition are given in Table 12, where also (XML) labels for the states and a natural (human) language description of the states is given.

Note that not all imaginable states have been considered in the contract e.g. what would happen in the event of bankruptcies, death of the holder, shutdown of Internet, etc. However, since our current focus in this section is the analysis of the compilation and execution of the contract, and not of the complexities of the DFA itself, our example is appropriate, and as simple as possible but not more.

TABLE 12 shows the state definition table for the example of this section. Each condition can be true (T), false (F), or irrelevant (—) for a particular state, which is thus defined by this set of values, one for each condition. Note that, in turn, a condition can have multiple components:

| State | Tag | $t < T$ | $S_T > K$ | paid | Natural language description |
|---|---|---|---|---|---|
| $s_0$ | <start> | T | — | — | The contract is up and running, maturity has not been reached. |
| $s_1$ | <waiting signature> | F | T | — | Maturity reached, a payment emitted, writer signature required. |
| $f_0$ | <no payment> | F | F | — | Contract finishes, no payment needed. |
| $f_1$ | <payment> | F | T | T | Contract finishes, payment has been made. |
| $f_2$ | <litigation> | F | T | F | Contract finishes, litigation required. |

Continuing with the description of the different elements of the abstract DFA we turn now to the list of inputs. This is also called the event alphabet. This is a list of the events that can happen in relation to the contract e.g. maturity reached, payment received, etc. These inputs, together with the set of current states of the DFA, determine the transaction to be submitted to the blockchain, as well as the parallel actions to be carried out by the agents; note, however, that although technically the transition function is a S×I→S mapping, not all inputs are relevant for all states. In our streamlined example these, together with a (XML) label and a natural language description of the event, are given in Table 13.

TABLE 13

List of contract inputs (event alphabet):

| Input | Tag | Natural language description |
|---|---|---|
| $i_0$ | <immature> | The contract is up and running, maturity has not been reached. |

TABLE 13-continued

List of contract inputs (event alphabet):

| Input | Tag | Natural language description |
|---|---|---|
| $i_1$ | <out of the money> | Maturity reached, $S_T \leq K$ (no payment needed). |
| $i_2$ | <in the money> | Maturity reached, $S_T > K$. |
| $i_3$ | <signature received> | Payment transaction signed by the writer. |
| $i_4$ | <signature refused> | Writer refuses to sign the payment transaction. |

Computationally, the events can also be regarded as a change in the conditions defining the state, although, as mentioned, some events are irrelevant for some (or all) states and do not cause a state transition. In the same spirit, a list of possible actions, not all relevant for all states, can be specified as in Table 14.

TABLE 14

List of contract actions:

| Input | Tag | Natural language description |
|---|---|---|
| $a_0$ | <no action> | No action required |
| $a_1$ | <notification> | Parties informed of completion of the contract. |
| $a_2$ | <request signature> | Create payment transaction and request writer signature. |
| $a_3$ | <litigation triggered> | Notify lawyers of refusal of payment. |

All these elements converge in the state transition table, in which the current (initial) state of the system (rows) together with the appropriate input (columns) determine, according to the table, the next (final) state of the system as well as the actions to be carried out in parallel to the transition. Note that in our DFA, besides transition transactions, we also contemplate completion transactions, which instead of placing the system in a subsequent state place it in an accepting state (f), which is a virtual (e.g. not incarnated on the blockchain and not associated with any script) state that represents the termination of the execution of the contract. An example for our European call option is given in Table 15, in which initial states are associated with rows, inputs with columns, and each cell contains subsequent state/action fields.

TABLE 15

State transition table of the contract:

|  | $i_0$ | $i_1$ | $i_2$ | $i_3$ | $i_4$ |
|---|---|---|---|---|---|
| $s_0$ | $s_0/a_0$ | $f_0/a_1$ | $s_1/a_2$ | — | — |
| $s_1$ | — | — | — | $f_1/a_1$ | $f_2/a_1, a_3$ |

In addition, it is common to represent the abstract DFA by a state diagram, shown in FIG. 13 for our example. Note that there is a correspondence between this diagram and the (computationally useful) state transition table, so no additional information is included in the diagram itself. FIG. 13 shows the state diagram for a European call option showing the states (blobs) and the blockchain transactions (triangles) to be submitted: origination (o), transitions (t) and completions (c).

Technical Description

The DFA compilation mechanism consists of different elements and files which will be discussed in turn. The computational structure embedded in these files, how the scripts associated with different states generate not only the blockchain transactions, but also subsequent scripts which in turn completely execute the contract, is the main focus of this present section of the present application. To start with, the system uses two source files; in our example:

DFA European call option—parameters.xml

DFA European call option—script.py

Here we are assuming, for concreteness, that the main language to be used for the generation of subsequent files and execution of the contract is Python 3.5, and that the parameters are provided in an XML 1.0 document. Of course, these implementation details are not essential to the invention and the skilled person would understand that the use of other standards would be equally acceptable.

The XML document contains a list of parameter fields (specified by the XML tags) and values for the particular contract at hand i.e. one particular European call option. In our example it has been written by hand, but it could also be created automatically, i.e. by computing resources or agents, or by a human entering the appropriate values via a graphical user interface (GUI), which can also be created in Python.

The main file for the technical specification of the system is the (Python) main script. This file contains, or inserts upon execution, a hard-coded version of the abstract state transition table (possible states, inputs and actions) and hard-coded functions specifying the DFA inputs and actions to be considered (e.g. how to check the stock price, clock, etc.). If relevant, i.e. for blockchain-based DFA implementations, it may contain hard-coded templates of the (Bitcoin) transactions to be submitted by the scripts to the network.

As explained above, the state transition table completely determines the DFA at an abstract level and is the only element needed for its functioning. Note, however, that there is a correspondence between the legal text and the DFA state transition table. In addition to these necessary elements, optionally, the script can also contain/generate different human-readable documentation, e.g. the state diagram, the alphabet, etc.

In order to compile and execute a blockchain-based DFA contract the user (human or computer) needs to fill the values of the parameters and run the main script. Using this hard-coded information on the script and the values for the parameters, upon execution, the script will establish the contract e.g. place it on the blockchain, and generate one or more computer programs (other scripts) which will be run continuously by the system of computing agents executing the contract. A possible sequence of instructions that could accomplish this is as follows:

1. Read parameter values (or input the values directly from a GUI). This loads the parameter values in memory, e.g. in a hash table (HT) structure (which in Python is called a dictionary) or in a distributed hash table (DHT), e.g. the bitTorrent network if this offers some advantages
2. Use the parameters and the hard-coded contract template to produce the legal contract. This document needs to be (digitally) signed by the writer of the option.
3. (Optionally) create the human-readable documentation for the contract.
4. Use the parameters and the hard-coded input and action functions to generate instances of these functions, with the appropriate parameter values.
5. Load in memory (HT, or DHT) the state transition table.
6. If relevant, create the origination transaction as specified and submit it to the blockchain network. This can be performed by using the Pybitcointools library. This creates a UTXO in the blockchain associated with a specific state of the contract on the Bitcoin blockchain as described above.
7. Create a Python script associated with the origination state ($s_0$) and run it (on the same or other computers). This agent (or set of agents) will receive/produce the appropriate inputs, execute the appropriate actions, the ones compatible with the state, and eventually either complete the execution of the contract or produce a transition transaction to another state, as well as spin-off subsequent scripts controlling those states.
8. Terminate the compilation (main script).

Upon termination of the compiling phase the system will thus be up and running. In accordance with an embodiment of the invention, there will be a UTXO on the blockchain associated with the initial state of the contract, and one or several agents (Python scripts running on botnet agents), which will be monitoring for inputs, ready to take actions, and to produce the appropriate transitions, which would either change the state of the DFA to another state or terminate it.

The sequence of instructions for a transition is:
1. Monitor or produce DFA inputs—function calls such as check the clock, receive messages, etc.
2. Once the input is determined read the transition table for the current state, this determines the next state and possibly an action to be taken.
3. Take the action if anything—possibly to a subroutine or function call, depending on the complexity
4. When relevant, create a transition transaction according to and submit it to the blockchain.
5. Create and run a Python script associated with the next state
6. Terminate the current script The sequence of instructions for the completion of the contract is:
1. Monitor or produce DFA inputs; these could be subroutine or function calls such as check the clock, receive messages, etc.
2. Once the input is determined read the transition table for the current state, this determines that the contract is to be completed and possibly an action taken.
3. Take the action if anything—possibly to a function call, depending on the complexity
4. If relevant, create a completion transaction according and submit it to the blockchain; this will spend the last UTXO associated with the contract
5. Terminate the current (and last) script The DFA is therefore executed by a set of independent agents (scripts), which receive enough information in turn from previous agents, thus going back to the initial main script and parameter files.

Thus, in accordance with one embodiment of the invention, contracts are executed by a set of agents (implemented as scripts) and generated dynamically as the system moves from state to state. These agents need to have access to the current state of the system (e.g. as incarnated by a UTXO on the blockchain), receive or generate the proper inputs according to the events happening in the real world, take the proper actions, and carry out the adequate transactions. All of this may be achieved within (e.g. Python) scripts using the appropriately defined functions and existing libraries. For example, in our European call option case, it should have access to a clock, to check whether the maturity of the contract has been reached, and to the current price of the asset. Given this information it can decide which is the appropriate input to consider according to the parameters.

Given this, and the actions specified in the transition matrix, the agent can decide which blockchain transaction to produce, thereby placing the system in the next state (in our case there is only one) or complete the execution of the contract appropriately.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of implementing a deterministic finite automata (DFA) on a blockchain, comprising steps of:
   storing a state transition table for the DFA in a storage resource external to the blockchain;
   associating a portion of data in a locking script of an unspent output (UTXO1) of a blockchain transaction (Tx1) with a state of the DFA in the state transition table;
   monitoring, by a program executing on a hardware processing element of the blockchain, based on the association of the unspent output (UTXO1) with the state of the DFA, for a trigger for a transition from the state of the DFA to a further state in the state transition table;
   detecting, by the program, the trigger; and
   automatically spending, by the program, the unspent output (UTXO1) of the blockchain transaction (TX1) in response to the trigger, wherein the automatic spending comprises:
   transmitting the blockchain transaction (TX1) over a network connection to a blockchain node of the blockchain; and
   recording in the blockchain, by the blockchain node in response to the automatic spending, the transition of the DFA to the further state.

2. A method according to claim 1 and further comprising the step of:
   using a further transaction ($TX_2$) to make another transition from the state of the DFA to a second further state,
   wherein the second further state is associated with a portion of data provided within a locking script of another unspent output (UTXO2) of the further transaction.

3. A method according to claim 1 and further comprising the step of:
   using a portion of code to implement or represent at least one state transition trigger.

4. A method according to claim 3 wherein:
   the portion of code comprises a machine-testable condition which provides a Boolean result based upon an input.

5. A method according to claim 4 wherein the input is determined at run time and is used by the portion of code to determine whether or not the unspent output (UTXO1) should be spent so as to move the DFA to the other state.

6. A method according to claim 1 wherein the portion of data in the unspent output ($UTXO_1$) is provided in a locking script.

7. A method according to claim 6 wherein the portion of data is a tag, label or a portion of metadata.

8. A method according to claim 1 wherein: the DFA is a model of a machine-executable smart contract.

9. A method according to claim 1 wherein: the unspent output ($UTXO_1$) comprises a locking script which includes a hash of a puzzle, a solution of which must be provided by an input of a further transaction in order to spend the output ($UTXO_1$) and transition the DFA to another state.

10. A method according to claim 1 wherein:
    the unspent output ($UTXO_1$) comprises a locking script which includes a hash of a redeem script which must be provided by an input of a further transaction in order to spend the output ($UTXO_1$) and transition the DFA to another state.

11. A method according to claim 10 wherein the redeem script comprises a cryptographic key.

12. A method according to claim 1 and further comprising the step of:
    using one or more computing agents to perform the step of associating the portion of the data in the locking script.

13. The method according to claim 1 wherein:
    the program, as a result of being executed, further monitors for an input signal; and
    the trigger is activated by the input signal.

14. A system for implementing a deterministic finite automata (DFA) on a blockchain, the system comprising:
    at least one blockchain node of the blockchain;
    a non-transitory memory for storing machine executable instructions; and
    a processor for accessing the memory and executing the machine executable instructions, wherein the machine executable instructions, when executed cause the processor to execute first operations for implementing a deterministic finite automata (DFA) on a blockchain, the first operations comprising:
       storing a state transition table for the DFA in a storage resource external to the blockchain; and
       associating a portion of data in a locking script of an unspent output (UTXO1) of a blockchain transaction (Tx1) with a state of the DFA in the state transition table;
    wherein the machine executable instructions further comprise a program of the blockchain, that when executed by the processor cause the processor to execute second operations, the second operations for the program comprising:
       monitoring based on the association of the unspent output (UTXO1) with the state of the DFA, for a trigger for a transition from the state of the DFA to a further state in the state transition table;
       detecting the trigger;
       automatically spend the unspent output (UTXO1) of the blockchain transaction (Tx1) in response to the trigger, wherein the automatic spending comprises:
          transmitting the blockchain transaction (Tx1) over a network connection to the at least one blockchain node of the blockchain; and automatically cause the transition of the DFA to the further state to be recorded in the blockchain by the at least one blockchain node in response to the automatic spending.

15. A system according to claim 14 wherein the system comprises:
a blockchain platform; and
at least one computing agent arranged to implement the DFA via the blockchain.

* * * * *